T. GARY.
PACKAGE FOR AND METHOD OF PACKAGING ENSILAGE.
APPLICATION FILED DEC. 29, 1911. RENEWED APR. 26, 1916.
1,186,391. Patented June 6, 1916.
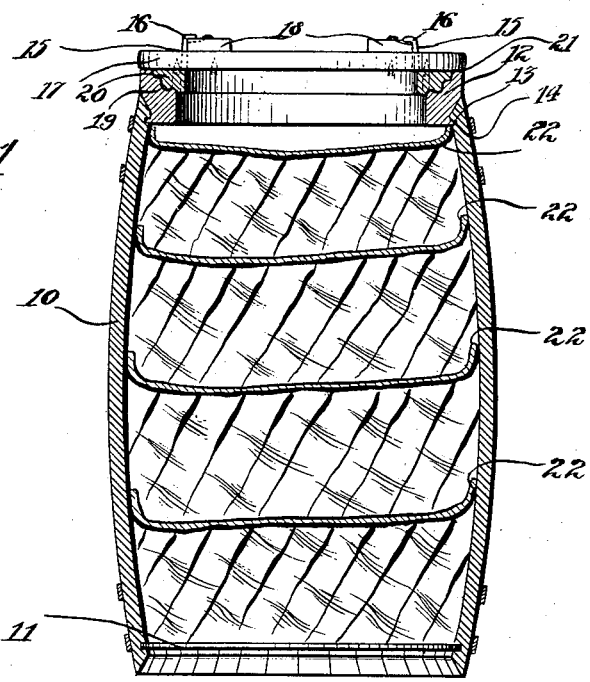
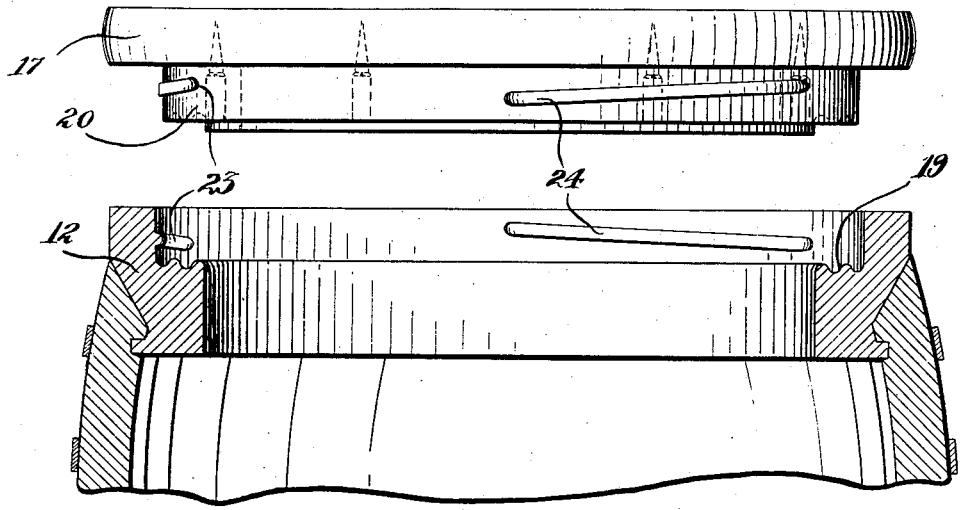
Witnesses
Charles S. Grumman.
James H. Marr
Inventor
Theodore Gary
By Edward E. Clement
Attorney

UNITED STATES PATENT OFFICE.

THEODORE GARY, OF MACON, MISSOURI.

PACKAGE FOR AND METHOD OF PACKAGING ENSILAGE.

1,186,391.        Specification of Letters Patent.      Patented June 6, 1916.

Application filed December 29, 1911, Serial No. 668,565. Renewed April 26, 1916. Serial No. 93,773.

*To all whom it may concern:*

Be it known that I, THEODORE GARY, a citizen of the United States, residing at Macon, in the county of Macon, State of Missouri, have invented certain new and useful Improvements in Packages for and Methods of Packaging Ensilage, of which the following is a specification, reference being had therein to the accompanying drawing.

At the present time the use of ensilage products is extremely small. Yet the crops suitable for ensilage products, such as corn, alfalfa, clover and so forth are very easily produced and produced in enormously large sizes. At the present time the use is limited practically without exception to the farm on which the product is made. This limited use has continued for quite a period of years, despite the fact that the exceptionally high food value of ensilage products is well known, and despite the fact also that good ensilage products have a high market value. This value is high for several reasons, chief among them being the fact that ensilage products have a food value a large per cent. greater than the dried stock foods such as fodder, hay and so forth. One does not have to seek far to find the reasons why this most valuable product has not been generally used throughout the country instead of having its use confined to a comparatively insignificant number of farms in the rural districts. In the first place no convenient and easily practised method has been heretofore devised whereby the products might be stored, preserved, and used according to the immediate needs of daily consumption. The silos used are very large structures. Very inefficient means are available to the average farmer for transporting the crop to the silo, for preparing it, for packing it, and for preserving it. The devices used are often crude. The methods used are particularly at fault as respects good preservation in that air is not at all effectually excluded from the silo, and after the silo has been first opened for feeding, the product is greatly damaged through the entrance of bacteria from the air. If the feeding be frequent, this damage is only to the exposed portions of the product, while if the bacteria be given a little time, a great portion of the product may be spoiled, but the loss occurring during the usual day feeding from a single large silo is considerable, especially when the general deterioration of the exposed portion in food value is taken into account. The use of a great number of small silos is generally objectionable for the reason that there are so many more closures to keep shut, and there is so much additional bulk to be handled, and because of the special provision which must be made for protecting them from the weather. Therefore it has been most convenient to use the very large silos in spite of their great disadvantages and utter unfitness, for marketing any portion of the ensilage crops. In the second place there has been no efficient method of handling ensilage products commercially and on the large scale necessary to place them in markets farther removed than a few miles from the farm on which the products have been produced. Ensilage products are generally so heavy and bulky, and also so wet that the ordinary methods of handling in bags, sacks, light boxes, and barrels, and other light and cheap containers will not suffice. The expense of packaging in air tight containers small enough to furnish feed for a single feeding only for a small number of stock, is so great as to make shipping in individual containers of this size prohibitive. When shipped in containers of such size as to cheapen packing and expense of transportation and handling, it is found that these containers hold a quantity sufficient for a number of feedings, and the products are therefore freely exposed to the air with resulting deterioration each time the package is opened, and if the package is allowed to remain open, a considerable portion of the product may become spoiled as in the case of the large silos in limited use at the present time.

In order to meet the commercial demands in placing ensilage on the market throughout the country so that it may be used throughout the cities as well as in the rural districts, it is necessary first, that a cheap method of packaging on or adjacent the producing farms be had, second, that cheap means and method of transportation be used, and third, that there be had economical and efficient method and means of preservation and gradual use. Through the method of packaging of my invention, and the means which I have devised for carrying it into effect, all of these things are made possible and more than that, wholly practicable. The great advantage resulting from such a general use of ensilage products as a stock food, can scarcely be overestimated. Not only does the ensilage product exceed the dry food products in specific food value by sixty or eighty per cent. as above mentioned, but besides that, a great portion of the green part of crops which now goes back into the land, and in many cases to waste, may be saved. This increases the net earnings of the country agriculturally it is estimated twenty or thirty per cent. Furthermore, farmers will be able to realize on their corn and other ensilage crops, at a much earlier time than they are at present able to realize on them, the present methods of marketing and controlling the market of the crops, resulting in long delays and slow pay for the farmer. Correspondingly, the financial condition of the farmers of the country would be made generally much better. And at and during the same time, stockholders throughout the country, small as well as large, and the poorest tenant as well as the richest landlord, are being supplied with a food product for their stock having the great merits as a food which are so well known.

According to the method of my invention, I pack and compress ensilage products into a container about the size of an ordinary oil barrel, of sufficient strength to stand the pressure at the packing, and adapted to be sealed air tight, separating and sealing the layers from each other as they are packed within the container, sealing them both from each other and from the outer air, and finally making an air tight closure of the container, thus sealing the entire number of layers within the container. The layers are of such a quantity as is suitable for either one or perhaps two feeds for a single head of stock. The container may be made of any moisture and air-proof material strong enough to stand transportation without puncture, and is preferably substantially cylindrical in shape with the end constituting its mouth capable of being opened substantially the full diameter of the cylinder. Preferably also, the material is compressed within the container while the container is supported in a form, and thus a high pressure may be used in packing. The compression may be applied either layer by layer, the individual layers separately packed and compressed, thus securing uniformity of the mass of the product, or the entire number of layers may be packed within the form, being separated and sealed from each other as they are packed, and the compression thereafter applied to the whole number of layers. Preferably also, the layers are packed one on top of another from the one end of the container to the other, a separating and sealing partition thus extending transversely of the container. Therefore, the container having a mouth opened substantially the full diameter, the layers may be readily removed as an entirety, one by one, and each without breaking the seal of the succeeding one. Thus is made a package, weighing about five hundred pounds, and of a size suitable for ready handling and transporting. And thus also is made a package by which the ensilage products are thoroughly preserved, and are adaptable for gradual use. As many layers may be removed from the container as are necessary for a single feeding without opening any of the remaining layers to contamination from the atmosphere. Therefore, few or many head of stock may be fed as is desired.

I have also devised a container constituting one means of carrying my invention into effect. Two forms of this container are shown in the accompanying drawings.

Of the drawings: Figure 1 is a sectional elevation of the one form of the container. Fig. 2 is a sectional elevation of the head of another form of container showing the cover elevated a short distance above its seat.

Both forms of container have a main body constituted by a barrel 10, preferably air and water tight, although any suitable lining may be used to render the barrel air and water tight. The bottom head of the barrel 11 is formed as is customary in barrels of this type. The top head is different. It is not only made removable from the barrel 10, but is provided with an opening normally closed by a cover, but of substantially the same diameter as the barrel, and through which the product may be readily removed. Referring first to Fig. 1, the top head of this form is made up of an iron ring 12 having a laterally extending rib or flange 13 adapted to be seated in the annular groove 14 in the stave ends in place of the usual head. Adjoining the rib 13 the ring 12 is tapered upwardly and downwardly to correspond with the similar taper of the ends of the staves. Projecting upwardly from the sides of this ring are a plurality of posts 15 having their heads 16 bent inwardly, while surmounting the ring is a cover 17 provided with pivoted latch members 18 adapted to be moved under the ends 16 of the posts 15, to lock the cover in place. As clearly shown, the engaging ends of the bottoms 18 are tapered to secure a wedging action. The inner portion 19 of the ring 12 is annularly corrugated to form an extended joint surface for the correspondingly formed outer surface of the flange 20 on the cover 17. A suitable packing may be placed in this joint if desired, but through the nature of the joint, air is altogether excluded. The proportions of the parts may or may not be made such as will engage the upper surface 21 of the ring 12, and the under surface of the cover 17, respectively. As clearly shown, this head is made of substantial construction. This is with a view to durability, so that after a package is emptied of its contents, the head can be removed and sent back to the distributing depot. As is apparent, the head may be simply removed by knocking off the upper hoop of the barrel, and thus spreading the upper ends of the staves. It is applied by simply reversing this process.

As shown in Fig. 1, there are four transverse layers of material in the package. Each of these layers is separated, according to the method of my invention, by a transverse air-proof and moisture-proof partition 22. Under the pressure applied the layers are hermetically sealed from each other, although for all practicable purposes, a general air-proof construction is sufficient.

The form of Fig. 2 differs from the form of Fig. 1, principally in the means used for fastening the removable cover 17. Instead of the posts 16 and latches 18, use is made of coacting screw thread ribs 23 and 24 on the ring 12, and the flange 20 of the cover respectively. Thus the cover is forced to its place by the screw action on rotating it. The joint 19 is formed immediately below the threads 23 on the ring 12.

In both forms of the container, the cover may be removed in a few seconds, as many layers taken out as desired, and thereafter the cover replaced quickly in a short period of time, the container being again closed air tight, and assisting in the preservation of the remaining unbroken layers of the product. The cover joint is made so close as to constitute a hermetical seal, and when packing is used as shown, this joint is wholly air and water tight.

It has been discovered by me that ensilage packaged in this manner will stand transportation over great distances and is kept in a perfect state of preservation for very long periods of time.

In carrying out the method of my invention on a large scale I propose to transport packaging machines right to the field where the product is made, and there package it absolutely fresh, thus saving the expense of transportation in bulk as well as obtaining the very best product.

Having thus described my invention what I claim and desire to secure by Letters Patent is:

1. The method of packaging ensilage which consists in compressing the package in a container in layers, completely sealing each layer from each other layer and finally sealing the container.

2. The method of packing ensilage which consists in compressing the same in a container in layers, and simultaneously hermetically sealing the layers from each other and from the outer air.

3. The method of packaging ensilage which consists in superposing measured portions of said material, separating and completely sealing from each other said portions as they are placed, and finally sealing the whole from the outer air.

4. The method of packing ensilage which consists in packing and sealing by layers in a container as follows: first placing a layer in an air tight container, second, hermetically sealing the layer within the container, third, placing another layer over the first, fourth, hermetically sealing the same, packing additional layers in the same manner, finally compressing all of the sealed and separated layers and thereafter hermetically sealing the mouth of the container.

5. The method of packing and sealing ensilage in a container as follows: first, placing a layer of the product in a container, second, compressing the said layer within the container, third, hermetically sealing the said layer within the container, fourth, placing a second layer over the sealed layer, fifth, sealing the said second layer as the first, and so on, placing each succeeding layer over the sealed preceding layer, and then sealing the said successive layer the same as those which have preceded it, until the container is filled to the point desired, and thereafter sealing the mouth of the container.

6. An ensilage package comprising a container of substantially uniform transverse section and having air-tight and moisture-proof walls, a plurality of layers of ensilage packed transversely of said container, and transverse sealing partitions of air and moisture proof material between said layers, making a sealing contact with the walls of the container and hermetically sealing each layer from each other layer and from the outer air.

7. An ensilage package comprising a container of substantially uniform transverse section and having air-tight and moisture-proof walls, a plurality of layers of ensilage packed transversely of said container, transverse sealing partitions of air and moisture-proof material between said layers, making a sealing contact with the walls of the container and hermetically sealing each layer from each other layer and from the outer air, said container having one end permanently sealed, and a removable and replaceable sealing cover for the other end common to all of said layers.

8. An ensilage package comprising a hermetically sealed container, and ensilage contained therein subdivided into a plurality of separately compressed and completely inclosed and sealed measured portions, all the portions being mechanically and collectively compressed within the container so as to form a solid mass made up of individually sealed cells.

9. An ensilage package comprising a body of ensilage compressed in layers, each layer being sealed from each other layer and all placed in a container also sealed, or otherwise suitably closed.

In testimony whereof I affix my signature in presence of two witnesses.

THEODORE GARY.

Witnesses:
FRANK H. WOODS,
JOHN GROVENER.